United States Patent [19]

Gummeringer

[11] 4,392,458
[45] Jul. 12, 1983

[54] INTERNAL COMBUSTION ENGINE WITH DOUBLE OSCILLATING PISTONS

[76] Inventor: Henry E. Gummeringer, 13107 Marble, NE., Albuquerque, N. Mex. 87112

[21] Appl. No.: 186,120

[22] Filed: Sep. 11, 1980

[51] Int. Cl.³ .............................................. F02B 53/00
[52] U.S. Cl. ...................................... 123/18 R; 74/54; 74/567; 74/569; 184/102
[58] Field of Search ....................... 123/18 R; 418/90; 91/339; 92/67, 68, 120; 417/481; 74/54, 567, 569, 762; 184/102

[56] References Cited

U.S. PATENT DOCUMENTS

| | | | |
|---|---|---|---|
| 1,348,251 | 8/1920 | Tamura et al. | 74/762 |
| 2,741,132 | 4/1956 | Goldberg | 74/54 |
| 3,190,270 | 6/1965 | Peterson | 123/18 R |
| 3,339,670 | 9/1967 | McGrew et al. | 418/90 X |
| 3,707,073 | 12/1972 | Bernstein | 123/18 R X |
| 3,731,661 | 5/1973 | Hatfield et al. | 123/43 R X |
| 4,272,229 | 6/1981 | Pape | 123/18 R X |

FOREIGN PATENT DOCUMENTS 2362187  6/1975  Fed. Rep. of Germany .... 123/18 R

*Primary Examiner*—Michael Koczo
*Attorney, Agent, or Firm*—Walter R. Keller

[57] ABSTRACT

This disclosure is directed to an internal combustion engine having a plurality of double oscillating pistons disposed around the interior of the housing, each side of each oscillating piston having a cam arm which applies the force of combustion to a cam gear. The cam gear has a cam surface on its exterior which engages the cam arm and a ring gear on its interior which engages a plurality of planetary gears which in turn drive a drive shaft having a sun gear.

3 Claims, 2 Drawing Figures

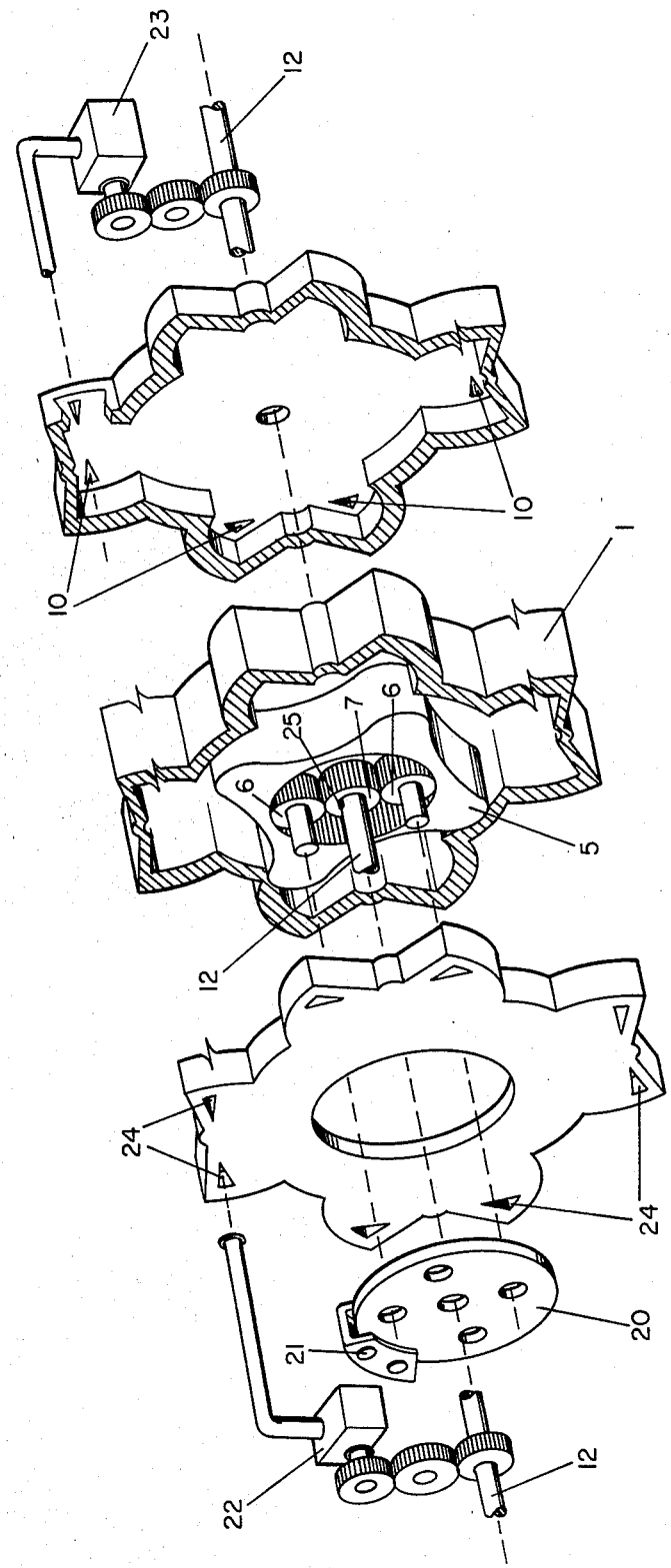
FIG.—2 ced with the lobes of said cam gear, further the position of each said oscillating piston is responsive to the position of said cam gear, and vice versa.

INTERNAL COMBUSTION ENGINE WITH DOUBLE OSCILLATING PISTONS

BACKGROUND OF THE INVENTION

1. Field of the Invention.

This invention relates broadly to internal combustion engines, and more particularly to engines having oscillating pistons.

2. Description of Prior Art.

Piston type engines, both gasoline and diesel have become widely used in spite of their short comings. Oscillating piston engines have been known in principle for a considerable period, and the use of cams to convert the oscillating motion of "flap postons" is illustrated by Bernstein, U.S. Pat. No. 3,707,073. Annular spacing of oscillating pistons about a drive cam is taught by Quartier, U.S. Pat. No. 2,938,505.

SUMMARY OF THE INVENTION

This invention discloses double acting oscillating pistons anularly arranged about a cam gear. It is an object of this invention to provide an engine having an improved power output to weight of the engine ratio.

BRIEF DESCRIPTION OF THE DRAWINGS

FIG. 2 is an external exploded isometric view of the invention.

DESCRIPTION OF THE PREFERRED EMBODIMENT

Figure 1:
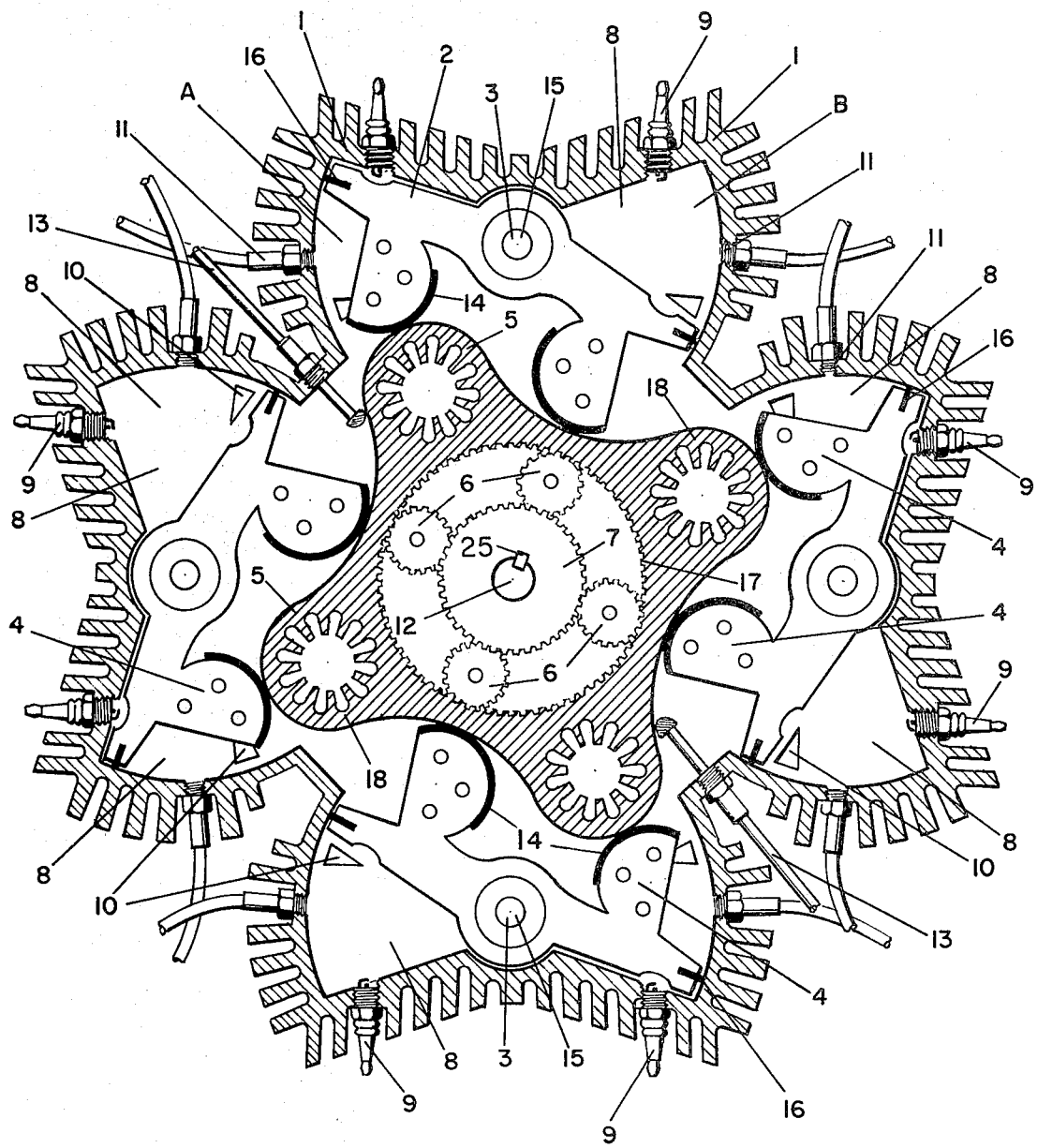
FIG. 1 is the cross section view of the invention.

FIG. 1 shows the invention to comprise a housing 1, a plurality of oscillating pistons 2 each having a pivot 3 and cam arms 4, a cam gear 5, a plurality of planetary gears 6, and a sun gear 7. For purposes of explanation the invention is depicted as having four oscillating pistons 2, however the scope of the invention is not limited to only four oscillating pistons 2. The housing 1 forms a plurality of working chambers 8, two for each oscillating piston 2, and said working chambers 8 each having a standard spark plug 9, an exhaust port 10, and a fuel injection port 11.

To explain the principles of operation, the cam gear 5 is turning clockwise as seen in FIG. 1, thus the planetary gears 6 are turning clockwise and the sun gear 7 rigidly affixed as by a key 25 to a drive shaft 12 are turning counter clockwise. The working chamber 8 designated A is shown fully charged with a fuel air mixture which is ignited by a spark from spark plug 9 in cylinder A. The expanding gases force the oscillating piston 2 toward the cam gear 5 about the pivot 3. The cam arm 4, an integral part of the oscillating piston 2, applies force to a lobe 18 on the exterior of the surface cam gear 5 further turning the cam gear 5 clockwise until the cam arm 4 is nearly bottomed in the adjacent valley of the cam gear 5 where upon the oscillating piston 2 uncovers or exposes an exhaust port 10. The gases in the working chamber A are then exhausted by an air blower 22, blowing air into one side of the working chamber A through an air input port 24 and a scavenging exhaust blower 23, also not shown, sucking the exhaust out of the exhaust port 10, and the working chamber A is filled with new unused air. The oscillating piston 2 is then forced upward by the cam gear 5 compressing the air. During this upward stroke of the oscillating piston 2, fuel is injected into the cylinder through the injector port 10 and the fuel air mixture compressed further as the oscillating piston 2 is forced toward the firing position from whence it started. The adjacent working chamber 8 designated B has the other side of the oscillating piston 2 in working chamber A. The sequence of events in working chamber B is the same as working chamber A except that the expansion stroke in working chamber A corresponds in time with the compression stroke in working chamber B, and vise versa. In order to minimize friction between the cam arms 4 and the cam gear 5, a spring loaded roller oil wick 13 is slideably mounted in the housing 1 so that it rolls and follows the cam gear 5 depositing oil thereon. As shown in FIG. 1, the engine has at any one time four firing working chambers 8, and four exhausting working chambers 8, or the equivalent of an eight cylinder engine. It should be pointed out that it is not necessary to have the planetary gears 6 or sun gear 7 but the cam gear 5 could be directly affixed to the drive shaft 12 as by the key 25. While the oscillating pistons 2 are made of material emphasizing strength, the cam surface of the cam arm will have to be covered by a low friction high wearing strength material, the cover is designated a cam shoe 14. The oscillating pistons 2 are pivoted about pivot rods 15 mounted in the housing 1. The ends and sides of the oscillating pistons 2 are fitted with seals 16 which wipe the working chamber walls. The cam gear 5 is rotatably mounted in the interior of the engine, and may be solid (not shown) and mounted rigidly and directly to the drive shaft 12 as by key 25. However, as depicted, the cam gear 5 has on its inner surface a ring gear 17 which mateably engages a plurality of planetary gears 6, which in turn mateably engage the sun gear 7 which is rigidly affixed to the drive shaft 12 as by key 25. In this manner, the engine may be running and the cam gear 5 turning, but the planetary gears 6 freely rotating about the sun gear 7, and said sun gear 7 and drive shaft 12 remaining stationary as in an "idle" mode. By applying a braking to the planetary gears 6 preventing their rotation about the sun gear 7 but permitting the planetary gears 6 to rotate on their own axes, the sun gear 7 is driven. The means for braking the rotation of the planetary gears 6 about the sun gear 7 can be any known braking means applied to the axles on which planetary gears 6 revolve. An illustration of one of the many possible means for braking is shown in FIG. 2 wherein the axles of the planetary gears 6 pass through the housing 1 and are rigidly affixed to a brake ring 20 to which disc brake pads 21 may be hydraulically forced. The injection of fuel and ignition is provided on a timed basis by known means, and the air input blower and exhaust blower are driven by the drive shaft.

I claim:

1. An oscillating piston internal combustion engine comprising:

a. a housing forming within a plurality of working chambers, and pivotally supporting between adjacent working chambers an oscillating piston, so that each side of each oscillating piston operates in one of the working chambers, and each said working chamber having therein a standard spark plug, and a fuel injection port, and an air input port and an exhaust port; and each side of each oscillating piston having a cam arm having an irregular nearly circular shaped cam surface, and a cam gear having an irregular exterior cam surface with a plurality of lobes, and said cam gear having means for engaging a drive shaft, and whereby when a combustible mixture is exploded in one working chamber on one side of an oscillating piston, the expanding gases from said explosion drive that side of the oscillating piston toward the cam gear, and the other side of the oscillating piston, having been exhausted and recharged with fresh air compresses the air therein and receives fuel by injection, and wherein each side of the oscillating piston as it travels toward the cam gear near the limits of its travel exposes air input ports and exhaust ports, and an air input blower which blows fresh air into the working chamber through the air input port and an exhaust blower which removes exhaust gases from the working chamber through the exhaust port, and wherein the housing between the working chambers and between the pistons has mounted therein a spring loaded oiler wick, and wherein the exhaust blower and the air input blower are driven from the driveshaft, and wherein the injection of fuel and the ignition spark for each working chamber are timed.

2. The engine of claim 1 wherein the means for engaging the cam gear with the drive shaft is to rigidly affix the cam gear to the drive shaft with a key.

3. The engine of claim 1 wherein the means for engaging the cam gear with the drive shaft comprises the cam gear having on its inner surface a ring gear which mateably engages a plurality of planetary gears, said planetary gears mateably engaging a sun gear which is rigidly affixed to the drive shaft with a key, and a breaking means to control the rotation of the planetary gears about the sun gear.

* * * * *